(12) United States Patent
Howes

(10) Patent No.: US 8,820,854 B2
(45) Date of Patent: Sep. 2, 2014

(54) BICYCLE WHEEL QUICK RELEASE ASSEMBLY WITH CLOCKABLE HANDLE

(75) Inventor: Dylan Howes, Monona, WI (US)

(73) Assignee: Trek Bicycle Corporation, Waterloo, WI (US)

( * ) Notice: Subject to any disclaimer, the term of this patent is extended or adjusted under 35 U.S.C. 154(b) by 317 days.

(21) Appl. No.: 13/197,203

(22) Filed: Aug. 3, 2011

(65) Prior Publication Data

US 2013/0033096 A1     Feb. 7, 2013

(51) Int. Cl.
*B62K 25/02* (2006.01)

(52) U.S. Cl.
CPC ............ *B62K 25/02* (2013.01); *B62K 2206/00* (2013.01)
USPC .................... 301/124.2; 403/374.1

(58) Field of Classification Search
USPC ............ 301/124.2, 132, 110.5; 280/278, 288; 403/109.5, 374.1, 374.2, 374.4, 374.5, 403/DIG. 8
See application file for complete search history.

(56) References Cited

U.S. PATENT DOCUMENTS

| | | | |
|---|---|---|---|
| 331,805 A | 12/1885 | McCalop |
| 2,630,020 A | 3/1953 | Juy |
| 3,610,659 A | 10/1971 | Gerarde |
| 4,033,627 A | 7/1977 | Moroni |
| 4,079,958 A | 3/1978 | Segawa |
| 4,114,409 A | 9/1978 | Scire |
| 4,400,038 A | 8/1983 | Hosokawa |
| 4,724,692 A | 2/1988 | Turin et al. |
| 4,763,957 A | 8/1988 | Poehlmann et al. |
| 4,789,206 A | 12/1988 | Ozaki |
| 4,805,941 A | 2/1989 | Downings et al. |
| 4,906,053 A | 3/1990 | Kawai |
| 4,964,287 A | 10/1990 | Gaul |
| 5,005,390 A | 4/1991 | Giannini et al. |
| 5,118,125 A | 6/1992 | Plunkett |
| 5,121,973 A | 6/1992 | Phillips |
| 5,135,330 A | 8/1992 | Chen |
| 5,165,762 A | 11/1992 | Phillips |
| 5,238,259 A | 8/1993 | Wilson et al. |
| 5,337,587 A | 8/1994 | Davidson |
| 5,364,115 A | 11/1994 | Klein et al. |
| 5,383,716 A | 1/1995 | Stewart et al. |
| 5,385,360 A | 1/1995 | Shook |
| 5,516,131 A | 5/1996 | Novotny |
| 6,409,281 B1 | 6/2002 | Kanehisa et al. |
| 6,742,849 B1 * | 6/2004 | Denby .................. 301/124.2 |
| 6,761,417 B2 | 7/2004 | Denby |
| RE38,873 E | 11/2005 | Denby et al. |
| 7,090,308 B2 * | 8/2006 | Rose et al. ............... 301/110.5 |
| 7,351,000 B2 * | 4/2008 | Meggiolan ............... 403/322.4 |
| 7,530,645 B2 | 5/2009 | Takachi |
| 7,537,291 B2 * | 5/2009 | Hara ....................... 301/124.2 |
| 7,556,321 B2 * | 7/2009 | Hara et al. ............... 301/124.2 |

(Continued)

FOREIGN PATENT DOCUMENTS

EP    1 762 480 A2    3/2007
EP    1 953 008 A1    6/2008

(Continued)

*Primary Examiner* — Drew Brown

(57) ABSTRACT

A bicycle wheel quick release assembly that includes an axle having a handle engaged with one end thereof. The handle is operable to alter a working length of the axle and securable to the axle at a variety of radial positions to manipulate the radial direction or clocking of the orientation of the handle relative to a longitudinal axis of the axle.

20 Claims, 7 Drawing Sheets

(56) References Cited

U.S. PATENT DOCUMENTS

| | | |
|---|---|---|
| 7,562,943 B2 | 7/2009 | Kanehisa |
| 7,654,546 B2 | 2/2010 | Watarai |
| 7,654,548 B2 | 2/2010 | Kanehisa et al. |
| 7,665,928 B2 | 2/2010 | Winefordner et al. |
| 7,669,871 B2 | 3/2010 | Watarai |
| 7,673,947 B2 | 3/2010 | Chang |
| 7,722,129 B2 | 5/2010 | Cusack |
| 7,753,454 B2 * | 7/2010 | Hara et al. .............. 301/124.2 |
| 8,056,987 B2 * | 11/2011 | Cusack .................... 301/124.2 |
| 2004/0084955 A1 * | 5/2004 | Denby ..................... 301/124.2 |
| 2008/0174171 A1 * | 7/2008 | Meggiolan ............... 301/124.2 |
| 2008/0185908 A1 * | 8/2008 | Hara ........................ 301/124.2 |
| 2008/0246332 A1 * | 10/2008 | Winefordner et al. ..... 301/124.2 |
| 2008/0284127 A1 | 11/2008 | Watarai |
| 2009/0115241 A1 * | 5/2009 | Kanehisa ................. 301/124.2 |
| 2009/0315295 A1 | 12/2009 | Laird et al. |
| 2010/0194184 A1 | 8/2010 | Cusack |

FOREIGN PATENT DOCUMENTS

| | | |
|---|---|---|
| EP | 1 977 965 A3 | 3/2009 |
| EP | 2 123 549 A2 | 11/2009 |
| EP | 1 958 864 B1 | 12/2010 |
| FR | 983137 | 6/1951 |

\* cited by examiner

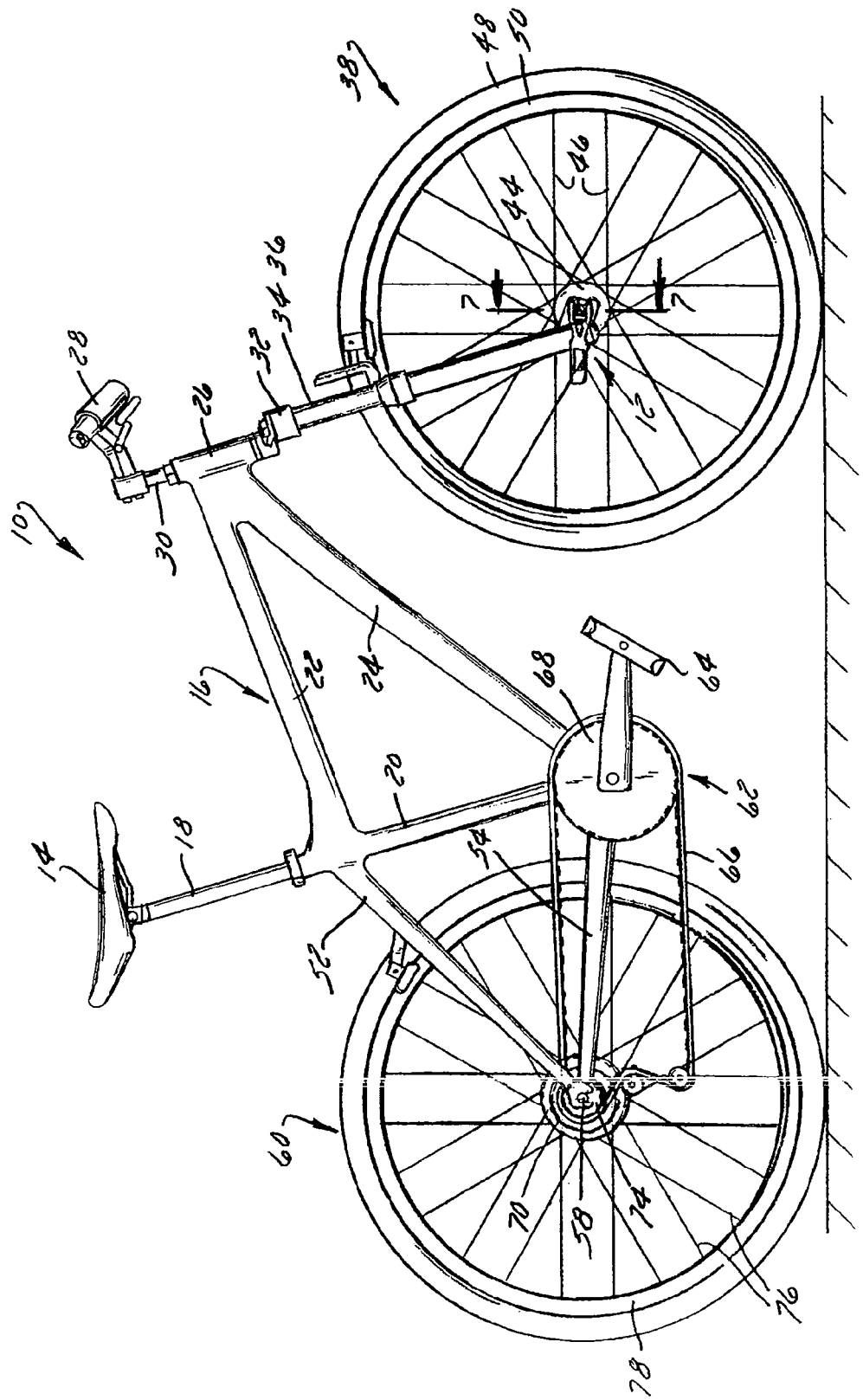

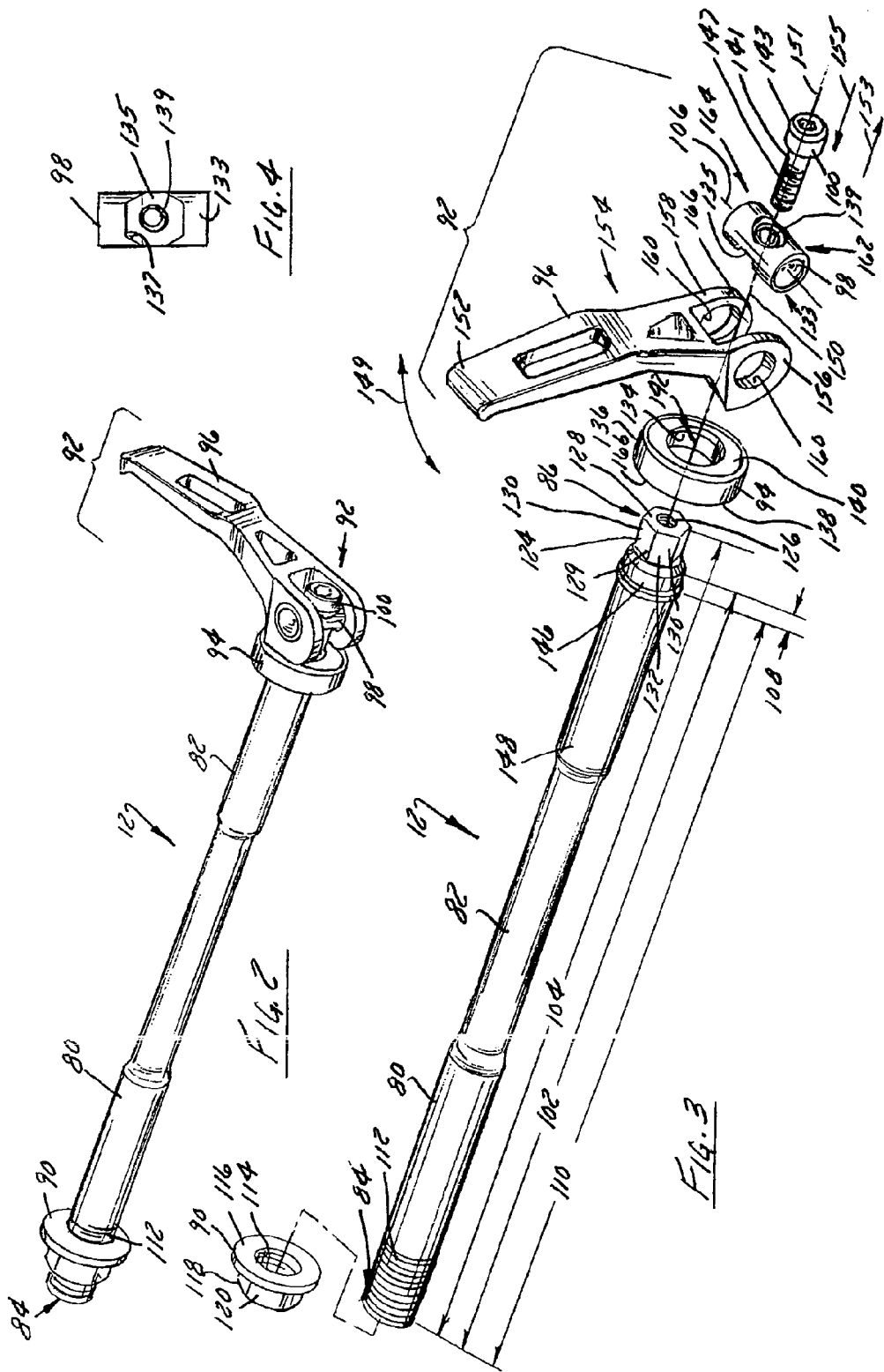

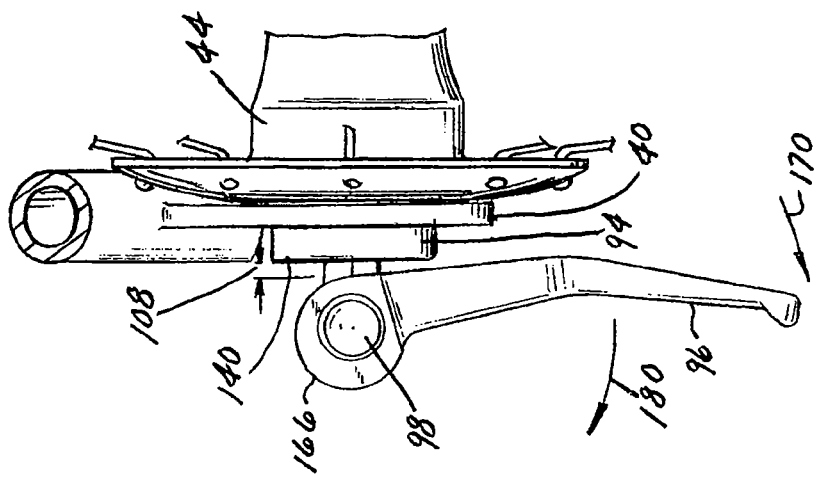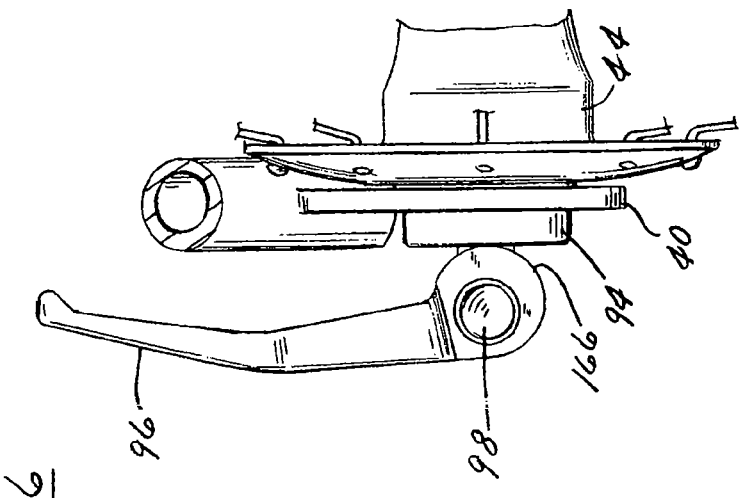

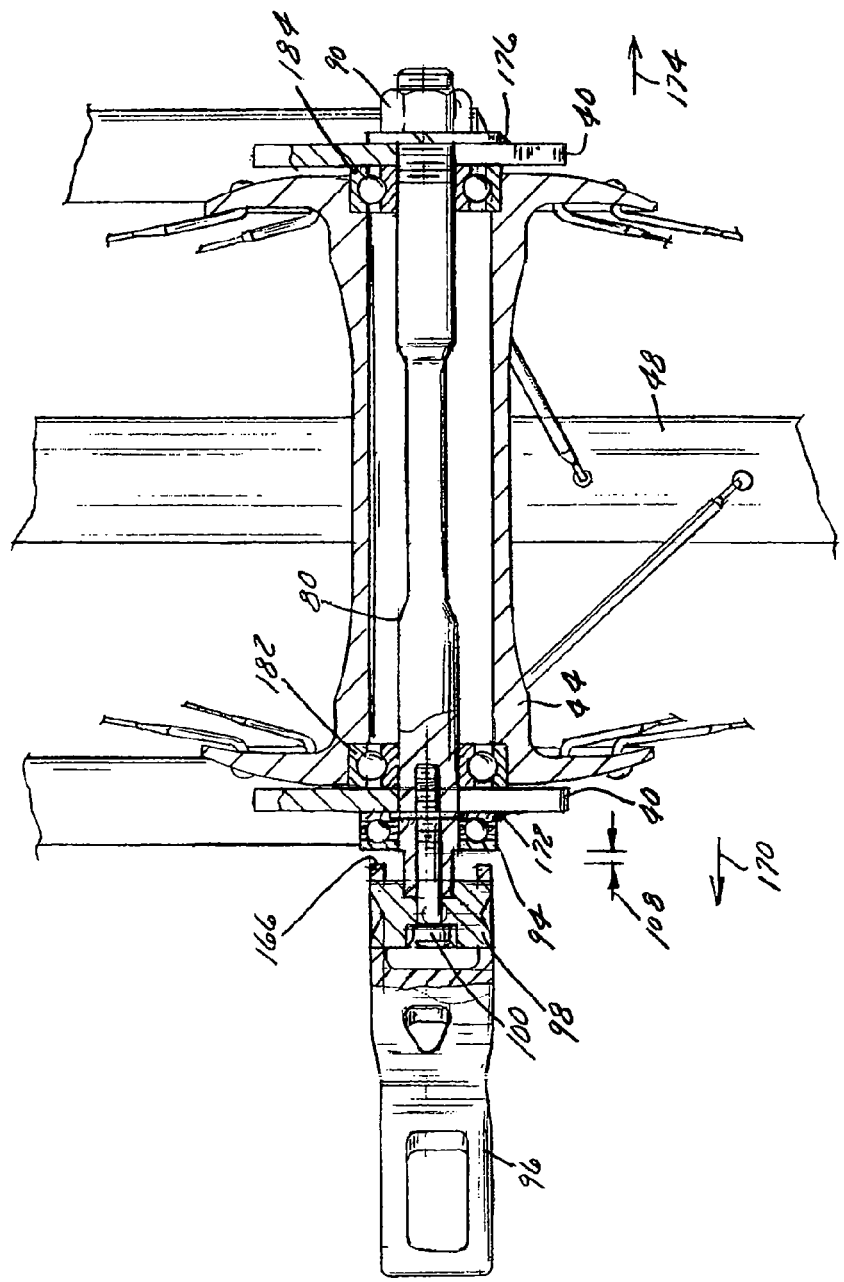

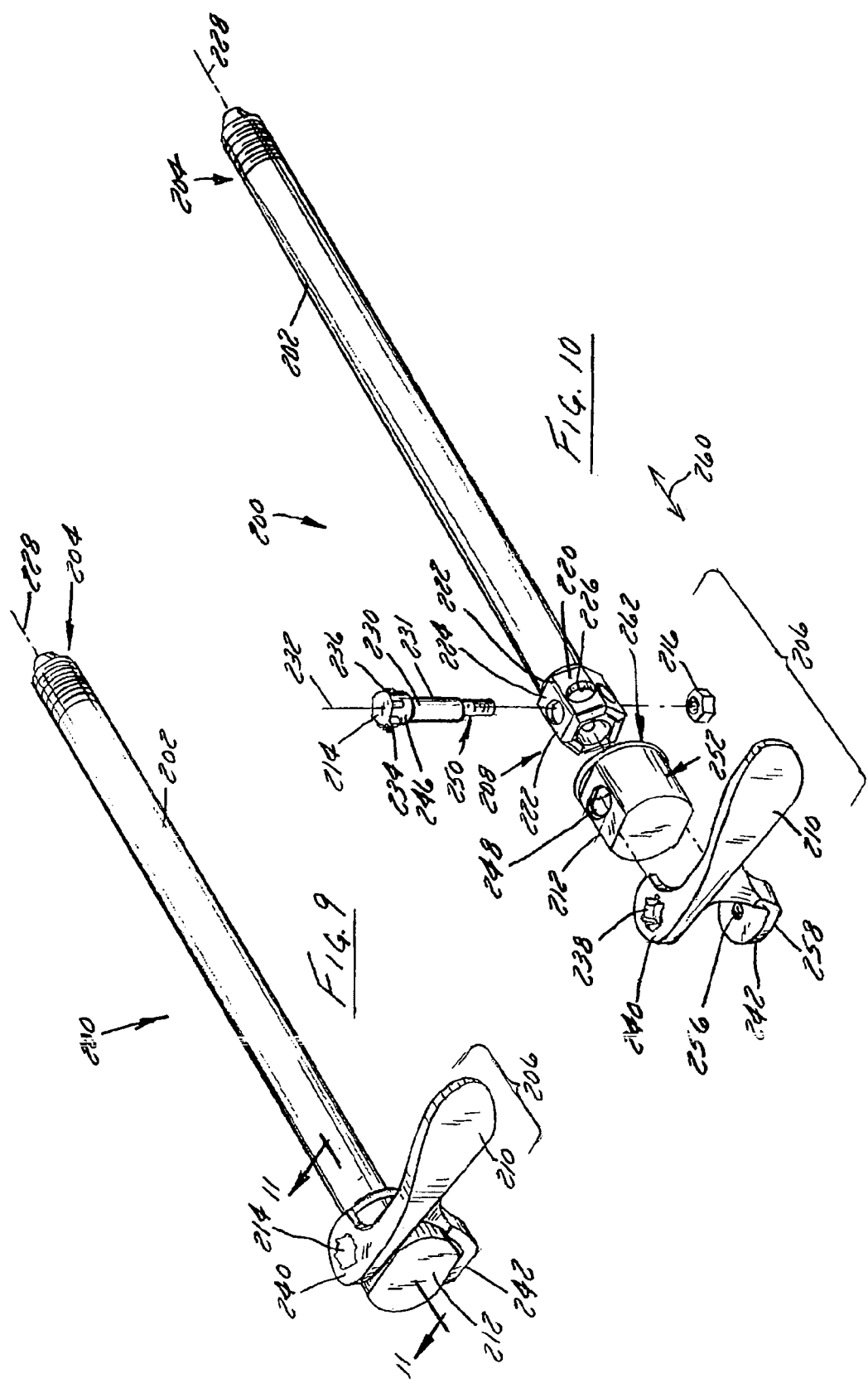

BICYCLE WHEEL QUICK RELEASE ASSEMBLY WITH CLOCKABLE HANDLE

BACKGROUND OF THE INVENTION

The present invention relates generally to bicycles and, more particularly, to a quick release assembly for securing a wheel to a bicycle that includes a handle that cooperates with the axle in any number of positions to allow "clocking" of the handle of the quick-release assembly relative to the axle.

Traditionally, the wheels of a bicycle are secured to the frame via an axle or skewer rod that passes through a hub of the wheel and cooperates with corresponding structure of the frame. Occasionally, the wheel assemblies require servicing such as the changing of a tire or the like. It is readily appreciated that replacing a bicycle tire requires disengaging at least one side of the wheel assembly from the adjacent frame of the bicycle and removing the tire or wheel, with or without the axle, from the dropouts associated with securing the wheel assembly to the bicycle frame. Commonly, do in part to the awkwardness of manipulating a bicycle by a wheel, it is often more convenient to remove the wheel assembly entirely from the bicycle to perform such service. It is also readily appreciated that such service or repair activities are often presented at the most inopportune times and places. That is, when ride performance is being monitored or inclement weather arises, the need for quick wheel repair can affect performance and/or ride enjoyment.

Others, having recognized the desire to quickly and efficiently remove, repair, and reinstall a bicycle wheel, have provided a litany of wheel retention systems intended to simplify the process of removing and reinstalling a bicycle wheel. An early solution to this problem was the introduction of slotted fork dropouts. The slotted dropouts cooperate with an axle or skewer rod of the wheel assembly such that loosening a retention system allows removal of the axle/wheel assembly from the bicycle without fully separating or disassembling the respective components of the wheel assembly. Although such systems enhanced the ease with which the wheel assembly could be removed from the bicycle, such systems also commonly require prior knowledge as to the operation and order of assembly of the wheel retention assembly so as to ensure proper desired orientation of the wheel release system relative to the bicycle after performance of the respective service activities.

Many bicycle wheel quick release assemblies include a handle that is connected to an axle or skewer that passes through the wheel assembly and engages the dropouts associated with the opposite sides of the same. Commonly, a cam or eccentric pivot is provided that, when manipulated by rotation of the handle, provides sufficient tension to maintain the operative interaction between the opposite ends of the axle or skewer assembly and the respective dropout and the interaction with the respective dropout and the wheel assembly. Said in another way, rotation of the handle in an "open" direction provides sufficient loosening of the wheel assembly to facilitate removal of the wheel and quick release assembly from the bicycle. Such systems commonly include a "clocking" mechanism that allows the handle to be oriented in a desired position relative to the underlying bicycle when the quick release assembly is secured thereto. As the handle commonly includes the cam or biasing assembly that tensions the axle, the clocking mechanisms and/or corresponding clocking structures are commonly provided at the fixed or non-operating ends of the skewer or axle and quick release assembly.

Commonly, the non-operating side quick release assembly clocking mechanism includes a nut that adjustably cooperates with the axle or skewer to define a repeatable closure pressure when the handle of the quick release assembly is closed. The nut in such configurations is commonly configured to cooperate with a nonsymmetrical recess formed proximate the dropout and/or with supplemental structures that provide a redundant securing means and/or are positionally fixed so to not interfere with the rotational engagement of the axle as the axle is threadably engaged therewith. Such configurations introduce additional small parts to the axle/skewer and quick release assembly and commonly require specialized tools to effectuate the desired orientation of the handle of the quick release assembly while also providing the desired closure pressure of the same.

Still others provide axle assemblies that include one or more threaded ends that threadably cooperate with the underlying bicycle assembly and/or the alternate end structures of the quick release assembly. It is appreciated that the threading of one or more ends of the axle or skewer; the threading of the bicycle structures, such as the dropouts; and/or the threading of corresponding structures of the quick release assembly must be properly aligned or indexed relative to one another to ensure that the handle of the quick release assembly attains a desired orientation when fully assembled with the bicycle. It is further appreciated that clocking the quick release handle in such a manner substantially limits the adjustability of the clocking of the handle. Commonly, such systems only provide one clocking position when the quick release assembly is engaged with the underlying bicycle. Although the pitch and thread-count of such thread-able interactions can be manipulated to alter the clocking position, such manipulations commonly prove impractical, are susceptible to degradation associated with repeatable engagement and disengagement of the wheel assembly, and can substantially increase the costs associated with machining and/or tooling the various threadable interactions.

Accordingly, there is a need for a bicycle wheel quick release assembly having a handle that can be oriented in various clocking positions relative to an underlying bicycle and/or bicycle wheel assembly and does so without effecting the repeatable operation of the quick release assembly to secure a bicycle wheel to a bicycle.

SUMMARY OF THE INVENTION

The present invention provides a bicycle wheel quick release assembly that resolves one or more of the aforementioned drawbacks. The quick release assembly includes an axle having a handle engaged with one end thereof. The handle is operable to alter a working length of the axle and securable to the axle at a variety of positions to manipulate the radial orientation, or the clocking, of the handle relative to a longitudinal axis of the axle. Such an assembly provides a wheel quick release assembly whose operating handle can be quickly and efficiently oriented to face in a desired direction relative to the longitudinal axis of the axle and the underlying bicycle structures.

Another aspect of invention useable with one or more of the features of the above aspect discloses a bicycle wheel quick release assembly that includes a skewer having a length that extends along a longitudinal axis of the skewer between a first end and a second end. A stop is engaged with the first end of the skewer and a pivot is engaged with the second end of the skewer. A handle is secured to the pivot and rotatable about an axis that is aligned with a longitudinal axis of the pivot for removing and securing a wheel to an underlying bicycle. The handle is securable to the skewer in a first radial position relative to the longitudinal axis of the skewer and a second radial position that is different than the first radial position relative to the longitudinal axis of the skewer without altering a range of operation associated with the rotation of the handle about the axis aligned with the longitudinal axis of the pivot. Such a construction allows repeatable operation of an open and closed orientation of the handle of the quick release assembly with respect to the underlying wheel at various radial positions of the handle relative to the axle.

Another aspect to the invention that is useable or combinable with one or more of the features of the above aspects discloses a bicycle wheel quick release assembly having an axle that includes a first end and a second end. A first head is secured to a first end of the axle. A thrust washer is positioned about the second end of the axle. A pivot pin is attached to the second end of the axle at a position outboard of the thrust washer. The pivot pin is engageable with the second end of the axle at a first orientation that defines a first axis of rotation of a handle relative to a longitudinal axis of the axle and a second orientation that defines a second orientation of rotation of the handle relative to the longitudinal axis of the axle wherein the first orientation and the second orientation have different radial positions with respect to the longitudinal axis of the axle. The handle is engaged with the pivot pin and rotatable about a longitudinal axis of the pivot from an open position to a closed position to alter a distance between a thrust washer and the first head when the pivot pin is in either the first orientation or the second orientation.

Another aspect of the invention that is useable with one or more of the features of the above aspects discloses a method of forming a variable clocking position bicycle wheel quick release assembly comprising. A rod is provided that has a length that allows opposite outboard ends of the rod to extend beyond adjacent dropouts of a bicycle assembly. The method includes providing a stop that is connectable to one of the outboard ends of the rod and adapted to engage an outboard side of one of the dropouts. A thrust washer, a pivot pin, and a handle are engaged with the outboard end of the rod that is opposite the stop such that when the handle is connected to the rod via the pivot pin, the handle is rotatable about a longitudinal axis of the pivot pin to alter a distance between an inboard face of the thrust washer and an inboard face of the stop. The handle is securable to the rod at more than one radial position relative to a longitudinal axis of the rod.

These and various other aspects and features of the present invention will be better appreciated and understood when considered in conjunction with the following detailed description and the accompanying drawings. It should be understood that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

The drawings illustrate one preferred embodiment presently contemplated for carrying out the invention. In the drawings:

FIG. 1 is an elevation view of a bicycle equipped with a wheel quick release assembly according to one embodiment of present invention;

FIG. 2 is a perspective view of the quick release assembly shown in FIG. 1 removed from the underlying bicycle with the handle in a first or closed position;

FIG. 3 is perspective exploded view of the quick release assembly shown in FIG. 2;

FIG. 4 is an elevation view of an inboard facing side of a pivot pin of the quick release assembly shown in FIG. 3;

FIG. 5 is a top plan view of an operating end of the quick release assembly shown in FIG. 1 with the handle oriented in a second or open position;

FIG. 6 is a view similar to FIG. 5 and shows the handle rotated about a pivot pin to the closed position;

FIG. 7 is a cross-section plan view of the quick release assembly shown in FIG. 1 with the handle in an open position to facilitate removal of the wheel and quick release assembly from the underlying bicycle and taken along line 7-7 shown in FIG. 1;

FIG. 9 is a perspective view similar to FIG. 2 of a quick release assembly according to another embodiment of the invention;

FIG. 10 is a perspective exploded view of the quick release assembly shown in FIG. 9.

Figure 8:
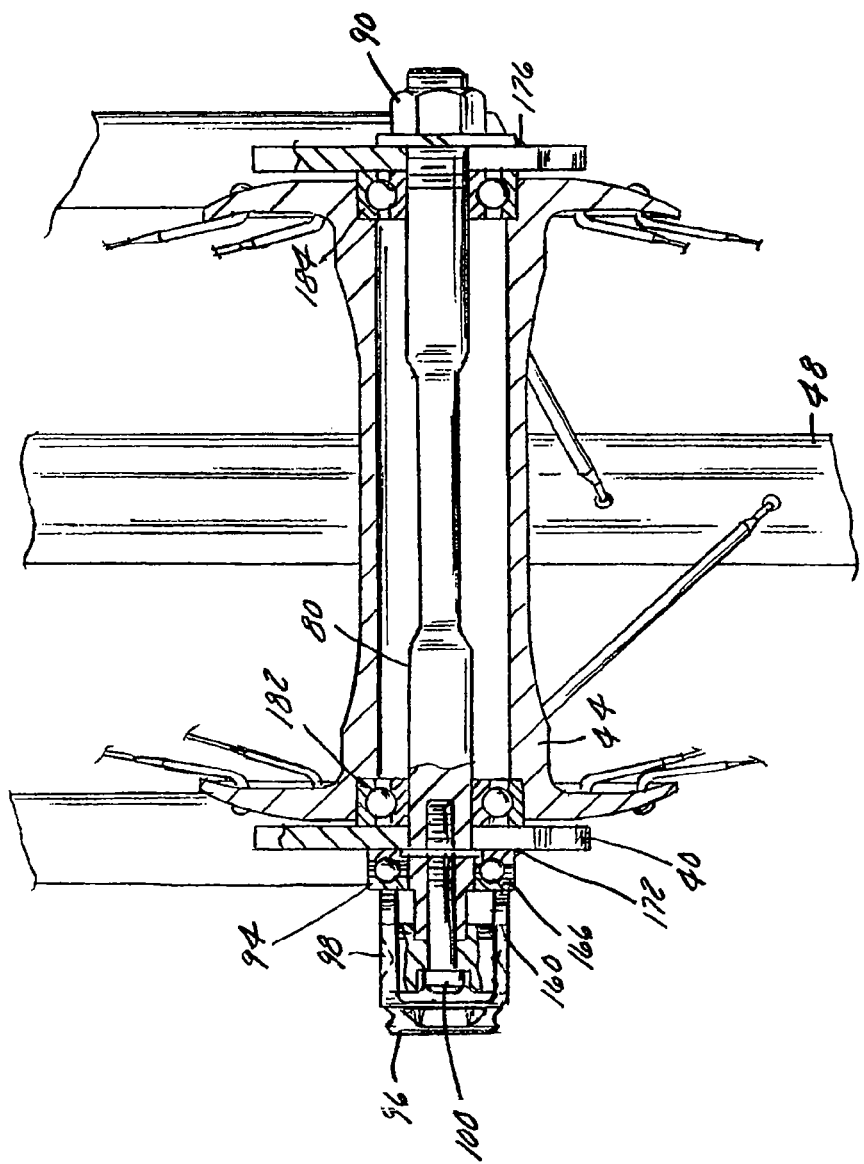
FIG. 8 is a view similar to FIG. 7 with the handle rotated to the closed position such that the quick release assembly secures the wheel assembly to the underlying bicycle.

In describing the preferred embodiments of the invention that are illustrated in the drawings, specific terminology will be resorted to for the sake of clarity. However, it is not intended that the invention be limited to the specific terms so selected and it is to be understood that each specific term includes all technical equivalents that operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENT

FIG. 1 shows a bicycle 10 equipped with a wheel quick release assembly 12 according to one embodiment of the present invention. Bicycle 10 includes a seat 14 that is slidably attached to a frame 16. A seat post 18 is connected to seat 14 and slidably engages a seat tube 20 of frame 16. A top tube 22 and a down tube 24 extend forwardly from seat tube 20 to a head tube 26 of frame 16. A handlebar or handlebar assembly 28 is connected to a stem tube 30 that passes through head tube 26 and engages a fork crown 32. The position of handlebar assembly 28 is fixed relative to stem tube 30 and fork crown 32 such that handlebar assembly 28 and fork crown 32 rotate together relative to head tube 26.

A pair of forks 34, 36 extend from generally opposite ends of fork crown 32 and are constructed to support a front wheel assembly 38 at an end of each fork, a dropout, or fork tip 40. Fork tips 40 cooperate with generally opposite sides of quick release assembly 12 so as to secure a hub 44 of front wheel assembly 38 to bicycle 10. A number of spokes 46 extend between hub 44 and a rim 48 of front wheel assembly 38. A tire 50 is engaged with rim 48 such that rotation of tire 50, relative to forks 34, 36, rotates rim 48 and hub 44. Handlebar assembly 28 is connected to bicycle 10 such that side-to-side rotation of the handlebar assembly 28 rotates wheel assembly 38 relative to a longitudinal axis of bicycle 10 thereby steering bicycle 10.

Frame 16 includes a seat stay pair 52 and a chain stay pair 54 that offset an axis of rotation 58 of a rear wheel assembly 60 from a crankset 62. Crankset 62 includes a pair of pedals 64 that is operationally connected to a flexible drive member, such as a belt or a chain 66 via a chain ring or sprocket 68. Rotation of chain 66 communicates a drive force to the rear section of bicycle 10. A gear cluster 70 is positioned at rear section and cooperates with chain 66. Gear cluster 70 is generally concentrically orientated with respect to axis 58 and includes a number of variable diameter gears.

Gear cluster 70 is operationally connected to a hub 74 of rear wheel assembly 60. A number of spokes 76 extend radially between hub 74 and a rim 78 of rear wheel assembly 60. As is commonly understood, rider operation of pedals 64 drives chain 66 thereby driving rear wheel assembly 60 which in turn propels bicycle 10. It is appreciated that the foregoing description of bicycle 10 is merely exemplary of a bicycle for use with the present invention. It is appreciated that bicycle 10 could be provided in any of a number of configurations including those configurations commonly referred to as street bikes, off-road or mountain bikes, hybrids of these types of bicycles, or other pedal driven vehicle configurations. It is further appreciated that, although the forthcoming description is directed to a quick release assembly associated with a front wheel assembly, bicycle 10 could include a second quick release assembly associated with rear wheel assembly 60.

FIGS. 2 and 3 show quick release assembly 12 removed from bicycle 10 and wheel assembly 38. Release assembly 12 includes a skewer, skewer rod, simply rod, or axle 80 that is defined by an elongate body 82 that extends from a first end 84 to a second and 86. Quick release assembly 12 includes a first head, head portion or stop 90 that cooperates with first end 84 of axle 80 and a quick release handle assembly 92 that movably cooperates with second and 86 of axle 80. It is appreciated that stop 90 could be provided in a number of manners such as by having axle 80 directly threadably engage an opening in the bicycle frame structure, such as dropout 40, with a threading that corresponds to the threading of first end 84 of axle 80.

Handle assembly 92 includes a spacer, washer, thrust body, or thrust washer 94, a handle 96, a pivot or pivot pin 98, and a fastener 100 that secures pivot pin 98 to axle 80. As discussed further below, in a preferred configuration, stop 90 adjustably cooperates with first end 84 of axle 80 and handle assembly 92 adjustably cooperates with second end 86 to define an open handle operating length, indicated by dimension line 102, of axle 80 that is less than a total length, indicated by dimension line 104, of axle 80. Manual manipulation or rotation of handle 92 about a longitudinal axis of pivot pin 98, indicated by line 106, defines a change in distance, indicated by dimension 108, associated with a secured operating length, indicated by dimension line 110, of axle 80 and a working change in length from the open handle position operating length indicated by dimension 102 of quick release assembly 12. It is readily appreciated that stop 90 can be manipulated to adjust dimensions 102 and 110 but not distance 108 associated with rotation of handle 96 relative to pivot pin 98.

First end 84 of axle 80 includes a threaded portion 112 that threateningly cooperates with a threaded opening 114 formed in stop 90. Stop 90 includes an inboard facing side 116 that faces handle assembly 92 and an outboard facing side 118 positioned at an opposite end thereof. As used herein, reference to the inboard and outboard directional indications generally refer to the orientation and positioning of relative structures relative to the longitudinal center plane defined by bicycle 10. For example, those structures defined as facing or being directed inboard are generally nearer the longitudinal center plane of bicycle 10 as compared to structures, positions, or orientations defined as facing outboard directions.

Outboard facing side 118 of stop 90 includes an operator surface 120 configured for interaction with a tool and/or the fingers of the user for manipulating the rotational interaction between threaded opening 114 of stop 90 with the threaded portion 112 of second end 84 of axle 80. It is appreciated that the rotational interaction between stop 90 and axle 80 can be adjustably configured to provide a desired operation of quick release handle assembly 92 with respect to a respective underlying bicycle 10. That is, inward translation of stop 90 will increase the closure pressure associated with operation of handle assembly 92 and outward translation of stop 90 will reduce the same pressure. It is further envisioned that stop 90 be adjusted to facilitate use of quick release assembly 12 with bicycle and/or wheel assemblies having different operational lateral widths.

Preferably, once configured for use with a desired bicycle, a lock, supplemental stop, set screw, or jamb nut is engaged with threaded portion 112 of axle 80 outboard of stop 90 so as to generally fix the position of stop 90 relative to axle 80. It is appreciated that such an operation fixing mechanism ensures the repeatable operability of handle assembly 92 with respect to an individual bicycle. It is further appreciated that other rotational elements, such as supplemental thrust washers or the like may be disposed adjacent the inboard facing surface 116 of stop 94 interaction with an underlying bicycle with the understanding that stop 94 be translated along axle 80 to accommodate such structures.

Second end 86 of axle 80 includes a noncircular variable position rotationally locking interface 124 that is constructed to cooperate with handle assembly 92. A threaded opening 126 is formed in a distal face 128 of second end 86 of axle 80. Interface 124 includes a number of lobes 129 that separate adjacent generally planar surfaces 130 that extend circumferentially about an exterior surface 132 of second end 86 of axle 80. Interface 124 is configured to key with or mesh with pivot pin 98 such that pivot pin 98 is only selectively rotatable about a longitudinal axis 151 of axle 80 relative to interface 124.

Thrust washer 94 includes an in interior radial surface 134 and an exterior radial surface 136. Thrust washer 94 includes a lateral inboard facing side 138 and a lateral outboard facing side 140. Interior radial surface 134 defines an opening 142 through thrust washer 94 that is shaped to slidably cooperate with axle 80 such that a portion 146 of an exterior surface 148 of axle 80 cooperates in a rotationally supported, and slidable in a lateral direction relative to bicycle 10 or a longitudinal direction along axis 151 associated with the longitudinal length 104 of body 82 axle 80.

Handle 96 is positioned outboard of thrust washer 94 and includes a handle portion 152 and a pivot pin portion 154. Pivot pin portion 154 of handle 96 includes a first cam arm 156 and a second cam arm 158. Each cam arm 156, 158 includes an opening 160 that is constructed to rotationally cooperate with alternate ends 162, 164 of pivot pin 98. As explained further below with respect to FIGS. 5-8, each arm 156, 158 includes a cam surface 166 that is constructed to slidably cooperate with outboard facing side 140 of thrust washer 94 such that rotation of handle 96 about the longitudinal axis 160 of pivot pin 98 manipulates the distance between inboard facing side 138 of thrust washer 94 and inboard facing side 116 of stop 90.

Referring to FIGS. 3 and 4, pivot pin 98 includes a lateral inboard or axle facing side 133 having a pocket, cavity, or recess 135 formed therein. Recess 135 has a perimeter shape 137 that generally corresponds to the shape of second end 86 of axle 80 such that pivot pin 98 is slidable relative to second end 86 only when properly aligned or indexed relative thereto. Pivot pin 98 includes a passage 139 that is generally aligned with recess 135 and shaped to slidably cooperate with a stem portion 141 of fastener 100. Passage 139 in pivot pin 98 is shaped to prevent passage of a head portion 143 of fastener 100 therethrough. Recess 135 and contour 137 define a second portion of the slidable but non-rotatable interface between pivot pin 98 and second end 86 of axle 80.

Stem portion 141 of fastener 100 includes a threaded portion 147 that threateningly cooperates with threaded opening 126 formed in second end 86 of axle 80. During assembly of quick release assembly 12, thrust washer 94 is positioned about axle 80. Pivot pin 98 is slidably oriented with respect to arms 156, 158 of handle 96 and the pivot pin and handle subassembly is rotationally or radially oriented, indicated by arrow 149, relative to axle 80, to allow slidable interaction along direction 151 between recess 135 of pivot pin 98 and second end 86 of axle 80.

Stem portion 141 of fastener 100 passes through opening 139 of pivot pin 98 and directly engages threaded opening 126 of axle 80 thereby radially and laterally orienting and securing handle 96 and pivot pin 98 relative to longitudinal axis 151 of axle 80. To alter the radial orientation of handle 96 relative to the axis 151, the user loosens or removes fastener 100, translates pivot pin 98 (with the handle 96 associated therewith) in an outboard lateral direction, indicated by arrow 153 rotates pivot pin 98 and handle 96 in directions 149 about axis 151 until a second slidable mating or indexed interaction between second end 86 and recess 135 is achieved. Pivot pin 98 can then be slid in an inboard lateral direction relative to axle 80, indicated by arrow 155, such that fastener 100 can be reintroduced or tightened into threaded opening 126 of axle 80. Such a construction allows handle 96 to obtain various radial positions relative to axis 151 without altering the relative rotational and/or axial orientation of axle 80 and/or stop 90 relative to bicycle 10 and/or otherwise manipulating the operating length attributable to rotation of handle 96 about pivot pin 98. That is, handle assembly 92 can achieve various clocking positions without requiring the reconfiguration or calibration of the quick release assembly for operation with the underlying bicycle.

Regardless of the radial orientation of handle assembly 92 relative to axle 80, handle 96 is rotatable relative to pivot pin 98 so as to manipulate the operating distance 108 associated with securing and/or loosening wheel assembly 38 relative to bicycle 10. Referring to FIGS. 5-8, FIGS. 5 and 7 show handle 96 oriented in an "open" position whereas FIGS. 6 and 8 show handle 96 oriented in a "closed" and secured position. As is commonly used in the art, the open quick release assembly is associated with removal of the wheel assembly from the underlying bicycle whereas the closed orientation of the handle assembly is associated with an orientation wherein the wheel is secured for use of the underlying bicycle.

Referring to FIGS. 5 and 7, when handle 96 is oriented in an open position, operating distance 108 is sufficient to allow outward lateral translation, indicated by arrow 170, of thrust washer 94 relative to dropout 40 and an optional redundant securing means, such as tab 172, associated with the respective dropout. In addition to allowing thrust bearing 94 to laterally clear fork tips 40 and tab 172, operating distance 108 is preferably sufficient to allow lateral outward translation, indicated by arrow 174, of stop 90 relative to fork tips 40 and an optional redundant security means, such as another tab 176, thereby allowing slidable translation of wheel assembly 38 relative to dropout 40. When wheel assembly 38 is positioned relative to fork tips 40 for securing wheel assembly 38 to bicycle 10, handle 96 of quick release assembly 12 is rotated in a closing direction relative to pivot pin 98, indicated by arrow 180 (FIG. 5), such that cam surfaces 166 slidably interact with outboard facing side 140 of thrust bearing 94 to compress fork tips 40 between thrust bearing 94, stop 90, and alternate bearings 182, 184 associated with wheel assembly 38.

As shown in FIGS. 6 and 8, when handle 96 is oriented in the closed position, cam surface 166 loads axle 80 in tension such that the of the interaction of stop 90 with fork tip 40 provides an optional radially interfering engagement with tab 176 and compresses thrust washer 94 against the alternate fork tip 40 and in a similarly optional radially interfering engagement with tab 172 thereby securely connecting wheel assembly 38 for rotational operation relative to bicycle 10. Once configured for use with a respective bicycle, a user can quickly and conveniently reposition the radial direction of operation of handle 96 relative to axle 80 such that the handle faces in a desired direction, such as a horizontal forward direction, a generally upward direction along a respective fork leg 34, 36, or in a rearward facing direction so as to avoid inadvertent operation of the handle caused by branches or the like associated with a ride environment. The present invention has proved particularly useful in those applications wherein the rotational orientation of axle 80 is determined as a function of its interaction with other structures of the bicycle and/or the wheel assembly. The direction of operation of handle 96 can be quickly and conveniently oriented in a desired radial direction with respect to the axis of the axle without interfering with the operating range associated with movement of the handle between the open to closed position and in a manner that does not require interaction with the mounting or securing structures associated with the second end of the respective axle.

FIGS. 9-12 show a quick release assembly 200 according to another embodiment of the present invention. Quick release assembly 200 includes an axle 202 having a first end 204 that is constructed to cooperate with a stop and/or a bicycle fork tip or dropout in a manner similar to that described above with respect to quick release assembly 12. Quick release assembly 200 includes a handle assembly 206 that operationally interacts with a second end 208 of axle 202. Handle assembly 206 includes a handle 210, a thrust washer or thrust body 212, a pivot pin 214, and an optional pivot pin nut 216.

Second end 208 of axle 202 includes a variable position longitudinally translatable but rotationally locking interface 220 that includes a number of lobes 222 that separate a number of planar surfaces 224. An opening 226 is formed in each planar surface 224 and extends in a direction that is generally normal to a longitudinal axis, indicated by line 228, of axle 202. Each opening 226 is shaped to receive an eccentric portion 230 of a stem 231 of pivot pin 214. Eccentric portion 230 is eccentrically offset relative to a longitudinal axis of rotation, indicated by line 232, of pivot pin 214.

Pivot pin 214 includes a head portion 234 having a number of lobes 236. Head portion 234 is shaped to slidably cooperate with a cavity 238 formed in at least one of a pair of arms 240, 242 of handle 210. Head portion 234 of pivot pin 214 includes a concentric surface 246 that is shaped to rotationally cooperate with an opening 248 formed in thrust body 212 and is concentric with respect to axis 232. A distal end 250 of pivot pin 214 rotationally cooperates with a side 252 of thrust body 212 that is generally opposite opening 248. Pivot pin 214 passes through or threadably cooperates with a passage 256 formed in arm 242 of handle 210. Alternatively, distal end 250 of pivot pin 214 can extend beyond the exterior surface 258 of arm 242 and threadably cooperate with an optional nut 216.

When assembled, pivot pin 214 defines the rotational axis of operation of handle 210 and cooperates with axle 202 to define the radial orientation of handle 210 relative to axis 228 of axle 202. The lobed interaction between pivot pin 214 and handle 210 results in rotation of pivot pin 214 during the operational rotational movement of handle 210 relative to thrust washer 212. The eccentric interaction between eccentric portion 230 of pivot pin 214 and openings 226 of second end 208 of axle 202 yields lateral translation, indicated by arrow 260, or translation along the longitudinal axis 228 of axle 202, of thrust body 212 relative to axle 202 to facilitate the open and closed orientation of quick release assembly 200.

Pivot pin 214 removably cooperates with handle 210, thrust body 212, and second end 208 of axle 202 to define variable radial orientations of handle 210 relative to axis 228 of axle 202 and thereby various radial positions of handle 210 relative to bicycle 10 that can be achieved in a manner that is at least in part independent of the respective orientation of axle 202 relative to the bicycle. A laterally inboard surface 262 of thrust body 212 can be shaped to generally correspond to the shape of second end 208 of axle 202 but need not be as the rotational position of thrust body 212, handle 210, and pivot pin 214 is also defined by the interaction of pivot pin 214 with the respective openings 226, 248, 238, 256 formed in each of axle 202, thrust body 212, arm 240, and arm 242 of handle 210, respectively.

Figure 11:
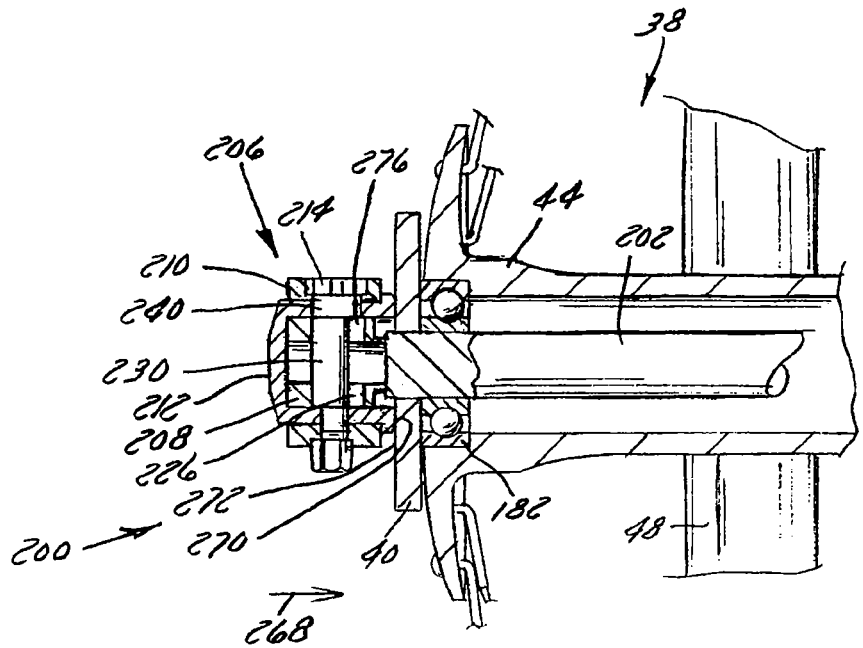
FIG. 11 is a cross-sectional view of the operating portion quick release assembly shown in FIG. 9 and taken along line 11-11 with the handle oriented in a closed position.

As shown in FIG. 11, when oriented in a closed position, handle 210, pivot pin 214, and thrust body 212 are associated with one another to generate an inboard laterally directly, indicated by arrow 268, compression of an inboard facing end 270 of thrust body 212 against an outboard facing side 272 of fork tip 40 and subjects axle 202 to a tension load caused in part by the interaction between end 204 of axle 202 and the stop or associated securing structure associated with the opposite fork tip 40. A gap 276 forms internal to handle assembly 206 caused by the interaction of eccentric portion 230 of pivot pin 214 and the respective opening 226 associated with second end 208 of axle 202. As explained further below, gap 276 is associated with the spacing that accommodates removal of the wheel assembly from the underlying bicycle when handle 210 is rotated to an open position.

Figure 12:
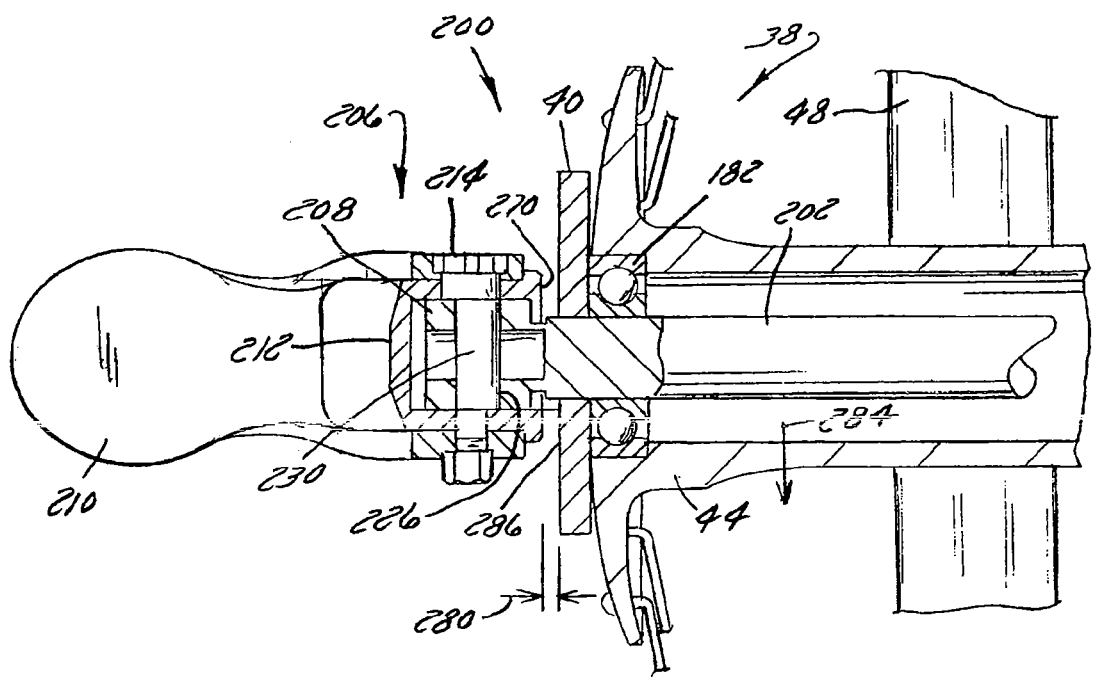
FIG. 12 is a view similar to FIG. 11 with the quick release assembly oriented in an open position to facilitate removal of the quick release assembly and a corresponding wheel from an underlying bicycle such as that shown in FIG. 1.

Referring to FIG. 12, when handle 210 is rotated to an open position to allow removal of wheel assembly 38, rotation of pivot pin 214 and the eccentric portion 230 of the pivot pin relative to the respective opening 226 of second end 208 of axle 202 translates gap 276 from the interior location to an external position that defines an operating distance, indicated by arrows 280, by generating an outboard lateral translation indicated by arrow 282, of thrust body 212 relative to second end 208 of axle 202. Distance 280 is sufficient to allow inboard facing side 270 of thrust body 212 to translate in the radial or lateral direction, indicated by arrow 284, relative to fork tip 40 and a supplemental securing means or a tab 286, and the corresponding structures associated with the other lateral side of the wheel and quick release assembly, in a manner similar to that described above with respect to quick release assembly 12, such that wheel assembly 38 can be slidably removed from fork tips 40. Like quick release assembly 12, quick release assembly 200 allows wheel assembly 38 to be quickly removed and installed relative to bicycle 10 and in a manner that allows variable independent radial positioning of handle 210 relative to the radial orientation and longitudinal axis 228 of axle 202 such that the direction of operation of the handle can be readily adjusted relative to the underlying bicycle 10, axle 202, and wheel assembly 38, without otherwise altering the desired or preset length associated with the quick release assembly.

Quick release assembly 12 and quick release assembly 200 each provide a bicycle wheel quick release assembly that is both efficient and simple to operate as well as simple to assemble and install. Each assembly also provides a quick release system having a handle assembly that cooperates with an axle of a bicycle in a manner that allows clockable or selective radially rotation positioning of the handle assembly relative to the longitudinal axis of the axle so that the handle can be oriented in various respective radial directions relative to the bicycle. It is further appreciated that non-rotational radially locking interfaces of quick release assemblies 12, 200 are exemplary of two possible cam and cam surface or follower orientations as well as exemplary of two selectively slidable but radial locking interfaces. Other cam and cam surface shapes and non-rotational radial locking interfaces are envisioned and within the scope of the claims. That is, rather than the hexagonal shaped interface, it is appreciated that the interface could have a curvilinear or partially curvilinear shape, such as an ellipse or semicircle, or have other generally rectilinear and/or toothed geometric shapes and configurations.

Therefore, one embodiment of the invention includes a bicycle wheel quick release assembly having an axle with a rotatable handle engaged with one end thereof. The handle is operable to alter a working length of the axle and securable to the axle at a variety of radial positions to manipulate the radial orientation or the clocking of the handle relative to a longitudinal axis of the axle. Such an assembly provides a wheel quick release assembly whose operating handle can be quickly and efficiently oriented to face a desired direction relative to the longitudinal axis of the axle and the underlying bicycle structures.

Another embodiment of the invention that is usable or combinable with one or more of features of the above embodiment includes a bicycle wheel quick release assembly having a skewer with a length that extends along a longitudinal axis of the skewer between a first end and a second end. A stop is engaged with the first end of the skewer and a pivot is engaged with the second end of the skewer. A handle is secured to the pivot and rotatable about an axis that is aligned with a longitudinal axis of the pivot for removing and securing a wheel to an underlying bicycle. The handle is securable to the skewer in a first radial position relative to the longitudinal axis of the skewer and a second radial position that is different than the first radial position relative to the longitudinal axis of the skewer without altering a range of operation associated with the rotation of the handle about an axis aligned with the longitudinal axis of the pivot.

Another embodiment of the invention that is useable or combinable with one or more of the features of the above embodiments includes a bicycle wheel quick release assembly having an axle that includes a first end and a second end. A first head is secured to a first end of the axle. A thrust washer is positioned about the second end of the axle. A pivot pin is attached to the second end of the axle at a position outboard of the thrust washer. The pivot pin is engageable with the second end of the axle at a first orientation that defines a first axis of rotation of a handle relative to a longitudinal axis of the axle and a second orientation that defines a second orientation of rotation of the handle relative to the longitudinal axis of the axle. The first orientation and the second orientation have different radial positions with respect to the longitudinal axis of the axle. The handle is engaged with the pivot pin and rotatable about a longitudinal axis of the pivot from an open position to a closed position to alter a distance between a thrust washer and the first head when the pivot pin is in either the first orientation or the second orientation.

Another embodiment of the invention that is useable or combinable with one or more features of the above embodiments includes a method of forming a variable clocking position bicycle wheel quick release assembly. A rod is provided that has a length that allows opposite outboard ends of the rod to extend beyond adjacent dropouts of a bicycle assembly. A stop is provided that is connectable to one of the outboard ends of the rod and adapted to engage an outboard side of one of the dropouts. A thrust washer, a pivot pin, and a handle are provided that are engageable with the outboard end of the rod that is opposite the stop such that when the handle is connected to the rod via the pivot pin, the handle is rotatable about a longitudinal axis of the pivot pin to alter a distance between an inboard face of the thrust washer and an inboard face of the stop. The handle is securable to the rod at more than one radial position relative to a longitudinal axis of the rod.

The present invention has been described above in terms of the preferred embodiment. It is recognized that various alternatives and modifications may be made to these embodiments which are within the scope of the appending claims.

What is claimed is:

1. A bicycle wheel quick release assembly comprising:
   a skewer having a length that extends along a longitudinal axis of the skewer between a first end and a second end;
   a stop engaged with the first end of the skewer;
   a pivot engaged with the second end of the skewer; and
   a handle secured to the pivot and rotatable about an axis that is aligned with a longitudinal axis of the pivot for removing and securing a wheel to an underlying bicycle, the handle being securable to the skewer in a first radial position relative to the longitudinal axis of the skewer and a second radial position that is different than the first radial position relative to the longitudinal axis of the skewer without altering a range of operation associated with rotation about the axis aligned with the longitudinal axis of the pivot.

2. The assembly of claim 1 wherein the second end of the skewer includes a variable position rotationally locking interface with the handle, and the variable position rotationally locking interface comprises position increments less than 180 degrees apart.

3. The assembly of claim 2 wherein the variable position rotationally locking interface is further defined as a hexagonal interface and locking of the hexagonal interface is defined by overlapping hexagonal shapes.

4. The assembly of claim 3 further comprising a fastener that secures the pivot to the skewer and engages the skewer in a direction aligned with the longitudinal axis of the skewer with the hexagonal interface oriented circumferentially about an axis of the pivot.

5. The assembly of claim 1 further comprising a thrust washer disposed about a portion of the skewer and positioned between the handle and a dropout of a bicycle.

6. The assembly of claim 5 wherein the thrust washer includes a first opening that slidably cooperates with the second end of the skewer and a second opening and a third opening that are oriented at an aligned crossing direction with respect to the first opening and cooperate with opposite longitudinal sides of the pivot.

7. The assembly of claim 5 wherein the pivot includes an eccentric portion that effectuates lateral translation of the thrust washer when the handle is rotated an axis of the pivot and the handle includes a cam portion that directly engages the thrust washer to effectuate translation of the thrust washer when the handle is rotated about the axis of the pivot.

8. A bicycle wheel quick release assembly comprising:
   an axle having a first end and a second end;
   a first head secured to a first end of the axle;
   a thrust washer positioned about the second end of the axle;
   a pivot pin attached to the second end of the axle, the pivot pin being engageable with the second end of the axle at a first orientation that defines a first axis of rotation of a handle relative to a longitudinal axis of the axle and a second orientation that defines a second orientation of rotation of the handle relative to the longitudinal axis of the axle wherein the first orientation and the second orientation have different radial positions with respect to the longitudinal axis of the axle; and
   a handle engaged with the pivot pin and rotatable about a longitudinal axis of the pivot from an open position to a closed position to alter a distance between a thrust washer and the first head when the pivot pin is in either the first orientation or the second orientation.

9. The assembly of claim 8 wherein the pivot pin is engageable with the second end of the axle at more than two radial orientations, and the radial orientations are less than 180 degrees apart.

10. The assembly of claim 8 further comprising a first non-rotatable interface formed at the second end of the axle and a second non-rotatable interface formed on an axle facing side of at least one of the pivot pin and the thrust washer.

11. The assembly of claim 10 wherein the first non-rotatable interface includes an opening formed in at least more than one of a plurality of planar surfaces of the first non-rotatable interface and each opening is shaped to cooperate with the pivot pin.

12. The assembly of claim 11 wherein the pivot pin includes an eccentric portion that cooperates with each respective opening formed in the second end of the axle and the thrust washer includes a passage that rotatably cooperates with a concentric portion of the pivot pin.

13. The assembly of claim 10 further comprising a fastener engaged with the pivot pin and threadably engaged with the second end of the axle to prevent translation of the pivot pin relative to the first non-rotatable interface of the second end of the axle when the second non-rotatable interface is formed on an axle facing side of the pivot pin.

14. The assembly of claim 8 wherein the handle includes a first cam arm and a second cam arm that cooperate with opposite ends of the pivot pin, each cam arm defining a cam surface that translates along an outboard facing side of the thrust washer during rotation of the handle about the pivot pin.

15. A method of forming a variable clocking position bicycle wheel quick release assembly comprising:
   providing a rod having a length that allows opposite outboard ends of the rod to extend beyond adjacent dropouts of a bicycle assembly;
   providing a stop connectable to one of the outboard ends of the rod and adapted to engage an outboard side of one of the dropouts; and
   providing a thrust washer, a pivot pin, and, a handle that engage the outboard end of the rod that is opposite the stop such that when the handle is connected to the rod via the pivot pin, the handle is rotatable about a longitudinal axis of the pivot pin to alter a distance between an inboard face of the thrust washer and an inboard face of the stop and the handle can be secured to the rod at more than one radial position relative to a longitudinal axis of the rod without altering the distance between the inboard face of the thrust washer and the inboard face of the stop.

16. The method of claim 15 further comprising forming a non-circular and radially locking interface between the pivot pin and the rod, and the radially locking interface comprises positions less than 180 degrees apart.

17. The method of claim 16 wherein the non-circular and radially locking interface is positioned about at least a portion of a surface of a cavity formed in the pivot pin and is positioned about at least a radially outward directed portion of an exterior surface of the respective outboard end of the, rod.

18. The method of claim 16 further comprising providing a fastener that cooperates with the pivot pin and the rod.

19. The method of claim 15 wherein passing the pivot pin through a first passage in the rod defines a first radial position of the handle relative to the rod and passing the pivot pin through a second passage in the rod defines a second radial position of the handle relative to the rod.

20. The method of claim 15 further comprising securing the pivot to the rod with a fastener that prevents translation of the pivot relative to the rod in a direction aligned with a longitudinal axis of the rod.

* * * * *